(12) United States Patent
Fried et al.

(10) Patent No.: US 7,792,941 B2
(45) Date of Patent: Sep. 7, 2010

(54) METHOD AND APPARATUS TO DETERMINE HARDWARE AND SOFTWARE COMPATIBILITY RELATED TO MOBILITY OF VIRTUAL SERVERS

(75) Inventors: Eric Philip Fried, Austin, TX (US); David Glenn Grost, Austin, TX (US); John Richard Houlihan, Round Rock, TX (US); Jorge D. Rodriquez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/689,034

(22) Filed: Mar. 21, 2007

(65) Prior Publication Data

US 2008/0235388 A1 Sep. 25, 2008

(51) Int. Cl.
*G06F 15/173* (2006.01)
*G06F 15/177* (2006.01)
*G06F 9/45* (2006.01)
*G06F 17/30* (2006.01)
*G07G 1/00* (2006.01)

(52) U.S. Cl. .................. 709/223; 709/226; 709/220; 703/22; 705/10

(58) Field of Classification Search .................. None
See application file for complete search history.

(56) References Cited

U.S. PATENT DOCUMENTS

| | | | |
|---|---|---|---|
| 6,260,065 B1* | 7/2001 | Leiba et al. .............. 709/224 |
| 6,522,995 B1* | 2/2003 | Conti et al. .............. 702/186 |
| 6,557,035 B1* | 4/2003 | McKnight ................. 709/224 |
| 6,675,149 B1* | 1/2004 | Ruffin et al. ................. 705/8 |
| 6,804,634 B1* | 10/2004 | Holzmann et al. ............ 703/2 |
| 6,813,674 B1* | 11/2004 | Velasco et al. ............. 710/311 |
| 7,155,639 B2 | 12/2006 | Gorshenev et al. |
| 2003/0139917 A1* | 7/2003 | Hardwick et al. ............ 703/21 |
| 2004/0078692 A1* | 4/2004 | Jackson et al. ............... 714/38 |
| 2004/0128651 A1* | 7/2004 | Lau ........................... 717/124 |
| 2005/0055592 A1* | 3/2005 | Velasco et al. ............. 713/322 |
| 2005/0131596 A1* | 6/2005 | Cherrington et al. .......... 701/29 |
| 2005/0234688 A1* | 10/2005 | Pinto et al. .................... 703/6 |
| 2005/0234697 A1* | 10/2005 | Pinto et al. .................. 703/22 |

(Continued)

OTHER PUBLICATIONS

USPTO Notice of Allowance for U.S. Appl. No. 11/689,214 dated Oct. 7, 2009.

*Primary Examiner*—Ario Etienne
*Assistant Examiner*—Ho Shiu
(74) *Attorney, Agent, or Firm*—Yee & Associates, P.C.; Matthew W. Baca

(57) ABSTRACT

A method and system for determining hardware and software compatibility related to mobility of virtual servers. Upon receiving an inventory of properties of a managed server which are relevant for compatibility testing, mandatory and optional properties available for use in a compatibility policy for a WPAR instance running on the managed server are defined. Mandatory compatibility tests are selected based on the mandatory properties in the compatibility policy for the WPAR instance. Optional compatibility tests are selected based on the optional properties in the compatibility policy for the WPAR instance. The selected mandatory and optional compatibility tests are associated with the compatibility policy, wherein the selected tests are executed to compare a profile of a potential target system with the WPAR instance and to determine compatibility of the potential target system with the WPAR instance prior to performing a mobility operation of the WPAR instance.

20 Claims, 6 Drawing Sheets

U.S. PATENT DOCUMENTS

| | | | |
|---|---|---|---|
| 2005/0234698 A1* | 10/2005 | Pinto et al. | 703/22 |
| 2005/0234753 A1* | 10/2005 | Pinto et al. | 705/7 |
| 2005/0234760 A1* | 10/2005 | Pinto et al. | 705/10 |
| 2005/0234761 A1* | 10/2005 | Pinto et al. | 705/10 |
| 2005/0234762 A1* | 10/2005 | Pinto et al. | 705/10 |
| 2005/0234763 A1* | 10/2005 | Pinto et al. | 705/10 |
| 2006/0247885 A1* | 11/2006 | Manfredi | 702/120 |
| 2007/0079199 A1* | 4/2007 | Chorn et al. | 714/733 |
| 2007/0174346 A1* | 7/2007 | Brown et al. | 707/200 |
| 2007/0250615 A1* | 10/2007 | Hillier | 709/223 |
| 2008/0186134 A1* | 8/2008 | Parkhurst et al. | 340/5.8 |
| 2008/0235378 A1 | 9/2008 | Fried et al. | |
| 2009/0070771 A1* | 3/2009 | Yuyitung et al. | 718/105 |

* cited by examiner

METHOD AND APPARATUS TO DETERMINE HARDWARE AND SOFTWARE COMPATIBILITY RELATED TO MOBILITY OF VIRTUAL SERVERS

BACKGROUND OF THE INVENTION

1. Field of the Invention

The present invention relates generally to an improved data processing system, and in particular to a computer implemented method, data processing system, and computer program product for determining hardware and software compatibility related to mobility of virtual servers.

2. Description of the Related Art

A virtualized process collection is an assembly of processes which comprise the runtime instance of a specific application, such as Websphere or DB2, deployed within a logical partition of an operating system. This collection can also be described as a container which can be relocated between logical partitions. In some systems, these virtualized process collections may be migrated from one server or physical device to another (i.e., mobility operation) to allow for load balancing the processes across the system. However, migration of the virtualized process collections requires that hardware and software environments of the affected host systems are compatible. For example, differences in processor architecture, operating system version, or installed software required to support the application must be identified to determine whether or not a process collection would not experience catastrophic failure in the case of relocation. Virtual server technologies in the current art do not address this compatibility issue due to the fact that these existing virtual partition technologies encompass all aspects of the system. One example of such a virtual server technology is VMotion™, which is a product of VMWARE®. VMotion™ migrates an entire system image, which includes the operating system. Migration of the entire system image presents a heavier container which represents a complete server riding on top of a mediation layer, thereby insulating actual hardware and software compatibility from the virtual server processes.

Another virtual server technology in the current art is the AIX® Workload Partition (WPAR) product. WPAR is a portion or representation of a system within an operating system. The WPAR may be implemented as an "Application WPAR" which comprises a thin wrapper around the process collection which makes up the application. In other words, WPAR may wrap a particular application instance (e.g., WebSphere®, DB2®, Oracle®, etc.). In this situation, there is no real isolation between the application processes and anything else that is running on the server. Alternatively, the WPAR may be implemented as a "System WPAR" in which processes operating in the System WPAR have no visibility to other processes running in other System WPARs. Part of the core technology of the WPAR is the ability to migrate a WPAR from one instance of an operating system (source system) to another instance of an operating system (target system). Since WPAR allows processes rather than an entire system image to be migrated, virtualized process collections as implemented in the AIX® WPAR product provide a lightweight solution with less overhead than other virtual partition technologies. However, since the WPAR technology leverages aspects of the host system directly, there is still a need for a higher level of compatibility between the source and target systems for mobility operations.

SUMMARY OF THE INVENTION

The illustrative embodiments provide a computer implemented method, data processing system, and computer program product for determining hardware and software compatibility related to mobility of virtual servers. Responsive to receiving, from a managed server, an inventory of properties of the managed server which are relevant for compatibility testing, the illustrative embodiments define mandatory properties and optional properties available for use in a compatibility policy for a workload partition instance running on the managed server. Mandatory compatibility tests are selected based on the mandatory properties in the compatibility policy for the workload partition instance. Optional compatibility tests are selected based on the optional properties in the compatibility policy for the workload partition instance. The selected mandatory and optional compatibility tests for the workload partition instance are associated with the compatibility policy, wherein the selected mandatory compatibility tests and selected optional compatibility tests are executed to compare a profile of a potential target system with the workload partition instance and to determine compatibility of the potential target system with the workload partition instance prior to performing a mobility operation of the workload partition instance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
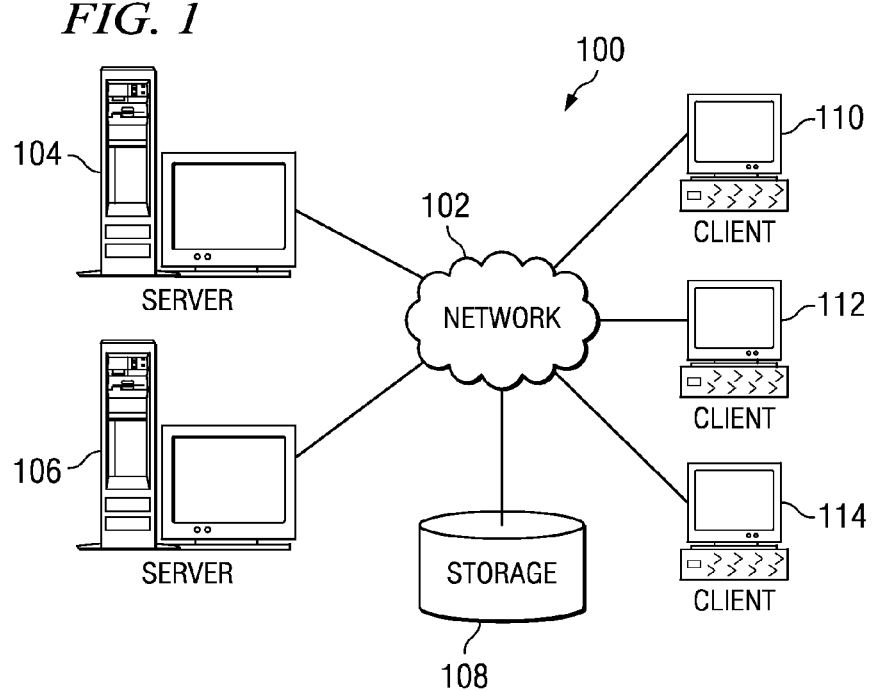
FIG. 1 is a pictorial representation of a data processing system in which the illustrative embodiments may be implemented.

The illustrative embodiments provide a mechanism which enables a management server to determine whether servers under management (managed servers) are compatible enough to support migration of process collections contained within WPAR instances. A WPAR instance is a portion or representation of a system within an operating system. Part of the core technology of WPAR is the ability to migrate a WPAR instance from a source system to a target system, such as from one server or physical device to another or from one system partition to another partition within the same server. To ensure compatibility with the source and target systems, the illustrative embodiments provide a compatibility module which is distributed with the base operating system of each managed server and leveraged by a management system. The compatibility module relies upon compatibility profile objects which define the compatibility properties of each managed server in the system. A compatibility profile object is used on each managed server to collect information related to the installed software and hardware configuration, and the compatibility profile object is shared between the management server and the managed server. The management server may then compare the information in the various compatibility profile objects collected from all managed servers registered with the system.

To compare the compatibility profile objects collected from the managed servers, the management server allows the user to define a custom compatibility policy for each WPAR instance based on which properties are important to a given WPAR instance. Since the user may define a custom compatibility policy by defining which properties are relevant to a particular application, the user may define a completely different compatibility policy comprising a different set of relevant optional criteria to another application. Consequently, when the compatibility policies for two applications running inside separate WPAR instances on the same server are executed for a mobility operation, the compatibility policies may return an entirely different list of compatible target servers for each of the applications.

When defining custom compatibility policies, the user is presented with a list of compatibility tests in two categories: mandatory compatibility tests and optional compatibility tests. Mandatory compatibility tests include tests which represent common criteria that must be executed for any WPAR instance, such as the processor type, revision type, or operating system type of a WPAR instance. Thus, for example, a Power4™ system would not be compatible with a Power5™ system. The mandatory tests are implemented by the management server when comparing the compatibility profile objects collected from all managed servers registered with the system. Optional compatibility tests comprise compatibility criteria which may be executed by a given WPAR instance when specified in a compatibility policy. One example of an optional compatibility criterion is an Oracle® instance which relies on large memory pages. Thus, the reliance on large memory pages illustrates a property which may be specific to that particular instance of Oracle® running a particular application. Based on the relevant properties defined by the user in the compatibility policy of a WPAR instance, these optional tests may be performed to further determine which target servers in the system are compatible with the WPAR instance beyond the mandatory compatibility testing of common criteria for all WPAR instances.

Thus, the user may specify which of the available compatibility criteria is relevant when determining and ranking available target systems for a WPAR mobility operation. A WPAR manager on the management server makes the determination of which targets are available for a mobility operation using the compatibility policies. A compatibility policy allows the WPAR manager to look across the array of available partitions and determine that a subset of the partitions fall into a category of compatible target systems, so that if the mobility operation is executed, catastrophic failure on the target system is unlikely to occur. Consequently, the WPAR manager leverages the compatibility policy defined by the user to filter target system candidates when ranking the compatible target system candidates for WPAR mobility operations.

Figure 2:
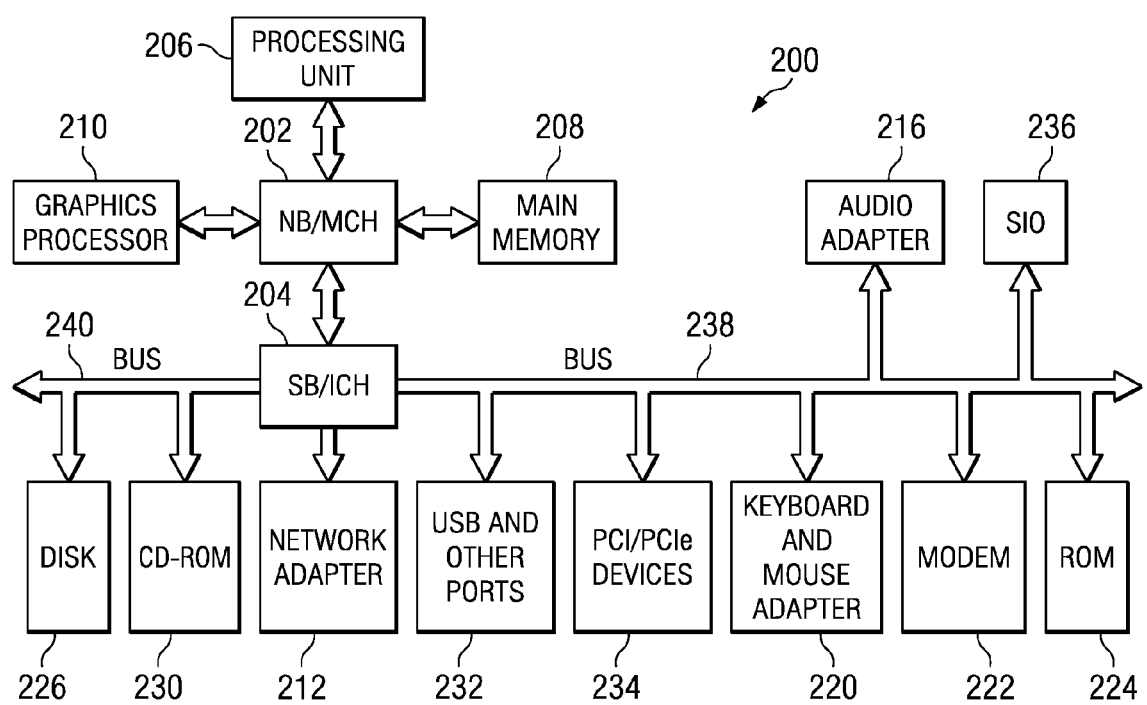
FIG. 2 is a block diagram of a data processing system in which the present invention may be implemented in accordance with the illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
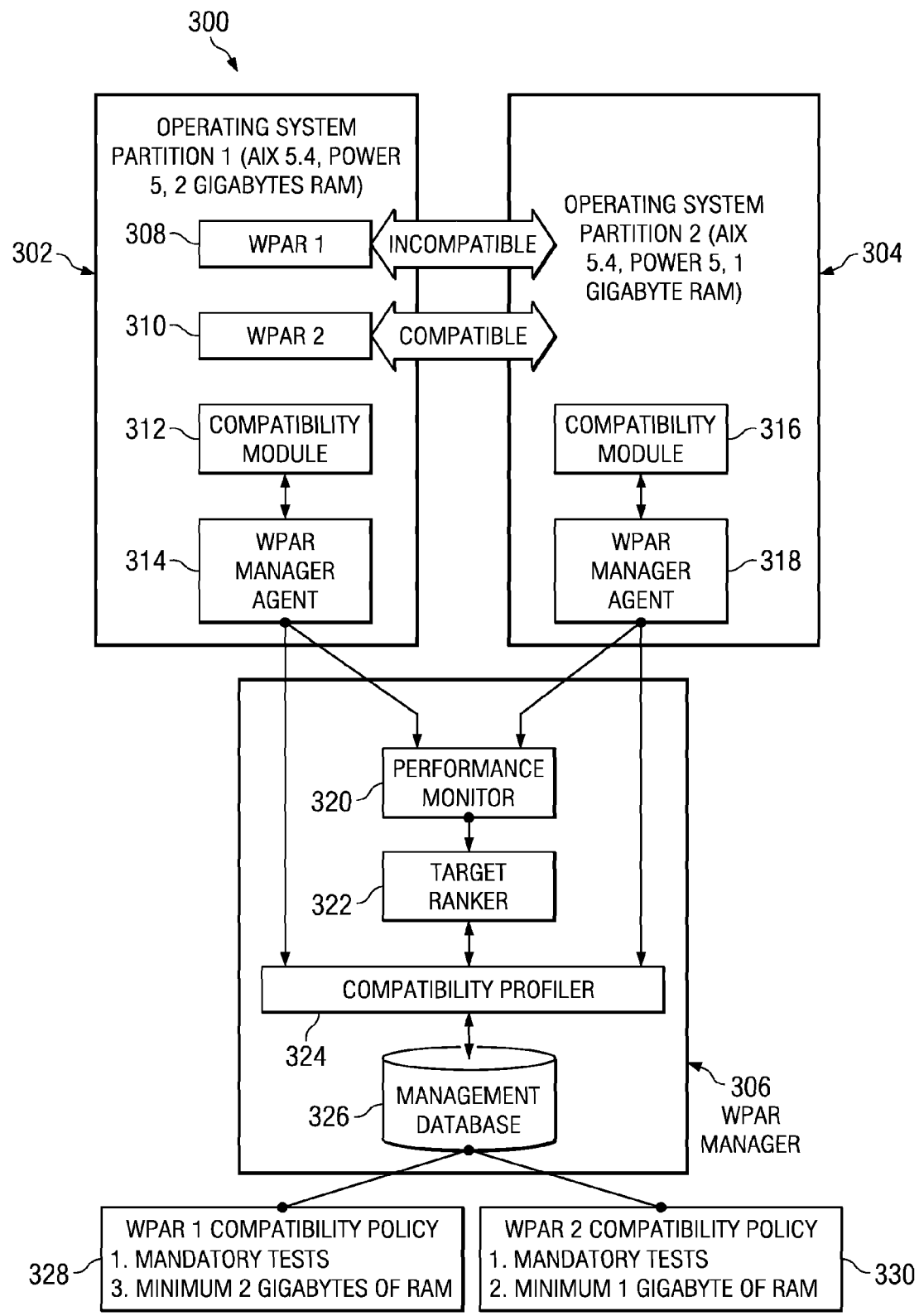
FIG. 3 is an exemplary diagram of an AIX® WPAR system in which the illustrative embodiments may be implemented.

FIG. 3 is an exemplary diagram of an AIX® WPAR system in which the illustrative embodiments may be implemented. AIX® WPAR system 300 may be implemented in, for example, data processing system 100 in FIG. 1. In this illustrative example, AIX® WPAR system 300 includes operating system partition 1 302, operating system partition 2 304, and WPAR manager 306. Operating system partitions 1 302 and 2 304 may reside in a single managed server or in multiple managed servers in the data processing system. WPAR manager 306 may reside in a management server in the data processing system. Operating system partitions 1 302 and 2 304 are implemented using AIX®, which is designed to interface with a WPAR management firmware, such as WPAR manager 306. AIX® is used only as an example in these illustrative embodiments. Other types of operating systems, such as OS/400® and Linux®, may also be used depending on the particular implementation.

Operating system partition 1 302 is implemented using AIX® 5.4 on a Power5™ processor with 2 GB of RAM. Operating system partition 1 302 comprises two WPAR instances, WPAR instance 1 308 and WPAR instance 2 310, compatibility module 312, and WPAR manager agent 314. Operating system partition 2 304 is implemented using AIX® 5.4 on a Power5™ processor with 1 GB of RAM. Operating system partition 2 304 comprises compatibility module 316 and WPAR manager agent 318.

Before migrating a WPAR instance on operating system partition 1 302, such as WPAR instance 1 308 and WPAR instance 2 310, to another operating system partition, such as operating system partition 2 304, WPAR manager agent 314 on operating system partition 1 302 executes compatibility module 312 in order to collect information about the hardware and software properties of the server on which the operating system partition resides. WPAR manager agent 314 stores the collected information in a compatibility profile object, and provides the object to WPAR manager 306.

WPAR manager 306 comprises performance monitor 320, target ranker 322, compatibility profiler 324, and management database 326. WPAR manager agents 314 and 318 provide information about operating system partitions 1 302 and 2 304, respectively, to performance monitor 320 and compatibility profiler 324. In this example, WPAR manager agent 314 and WPAR manager agent 318 each provide a compatibility profile object to compatibility profiler 324. WPAR manager 306 stores these compatibility profile objects of each managed server in management database 326. WPAR manager 306 compares the information in the collected compatibility profile objects to determine if the operating system partition 2 304 is compatible enough to support the migration of WPAR instances 308 or 310 from operating system partition 1 302 to operating system partition 2 304.

Target ranker 322 is used to compile a list of target systems which are compatible with the source system based on the information provided by compatibility profiler 324.

Management database 326 also includes the compatibility policies of each WPAR instance. For example, compatibility policy 328 of WPAR instance 1 308 specifies which mandatory tests are applicable for compatibility testing and that a target system should have a minimum of 2 GB of RAM. Compatibility policy 330 of WPAR instance 2 310 specifies which mandatory tests are applicable for compatibility testing and that the target system should have a minimum of 1 GB of RAM. Based on the compatibility policies in this illustrative example, WPAR instance 2 310 is shown to be compatible with operating system partition 2 304 since the mandatory tests will indicate that operating system partition 2 304 is compatible with WPAR instance 2 310 (e.g., both use AIX® 5.4 on Power5™), and operating system partition 2 304 meets the minimum memory requirements of WPAR instance 2 310.

Figure 4:
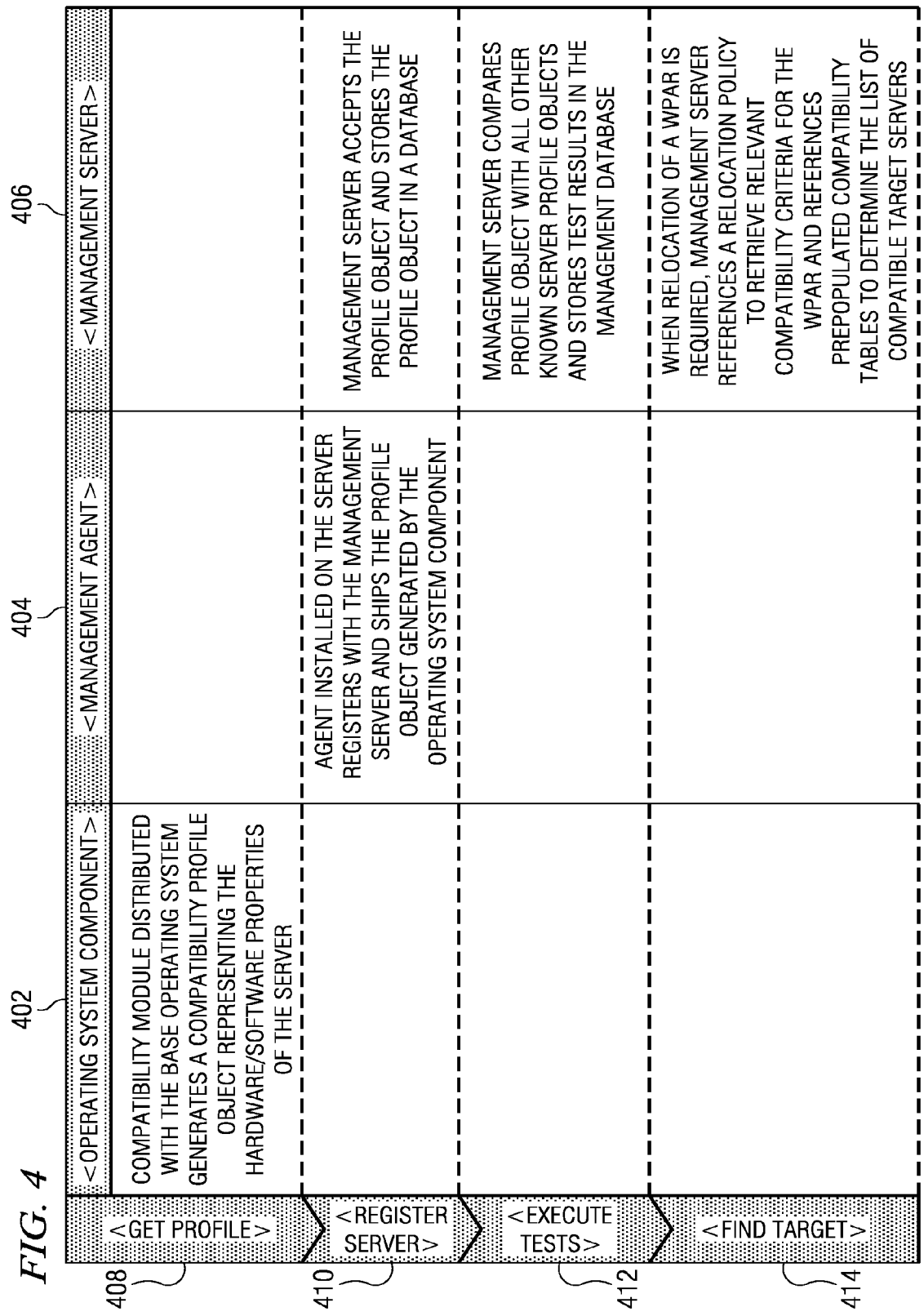
FIG. 4 is a diagram illustrating the phases of the compatibility testing process in accordance with the illustrative embodiments.

FIG. 4 is a diagram illustrating the phases of the compatibility testing process in accordance with the illustrative embodiments. The phases of the process may be implemented using an operating system component 402 of a managed server, a management agent 404 on each managed server, and a management server 406 where the compatibility testing operations are executed. A compatibility module is distributed with the base operating system component of each managed server and is responsible for managing the profile of a particular managed server. In the Get Profile phase 408 of the process, the compatibility module generates a compatibility profile object representing the hardware and software properties of the server. When the compatibility module is executed by a management agent on the management server, the compatibility module collects a detailed inventory of the various properties which have been determined to be relevant for compatibility testing and stores the collected information as a compatibility profile object.

In the Register Server phase 410 of the process, the management agent installed on the managed server registers with the management server and provides the compatibility profile object generated by the compatibility module to the management server. The management server then accepts the compatibility profile object and stores the compatibility profile object in a profiles table in the management database.

In the Execute Tests phase 412 of the process, the management server compares the compatibility profile object with all other compatibility profile objects generated from other managed servers which were previously registered with the management server. This comparison comprises mandatory compatibility tests in which common compatibility criteria must be met for each server in the system. The results of the mandatory compatibility tests are stored in the management database, wherein a compatible result of a comparison of mandatory tests populates a compatible profiles table in the management database, and failures of optional tests populate a compatibility failures table in the management database. Passing all mandatory tests will cause an entry to be made in the CompatibleProfiles table indicating that the two server profiles are generally compatible. Each failure of an optional or mandatory test creates one entry in the CompatibilityFailures table. When target identification occurs, the WPAR Manager will first verify that all mandatory tests have passed by looking at CompatibleProfiles before looking at the CompatibilityPolicy for the WPAR. If all mandatory tests have passed, then the CompatibilityPolicy is referenced to find which optional tests, if any, are relevant for the specific WPAR. If any of these optional tests are recorded in the CompatibilityFailures table then the target profile is removed as a candidate.

When relocation of a WPAR instance is required, the management server in the Find Target phase 414 of the process builds an initial list of target servers based on the CompatibleProfiles table for the source server listed in the management database. Based on the compatibility policy, the management server generates and populates a list of target systems which are compatible to the optional properties of the WPAR instance by filtering the initial list based on the compatibility failures observed between the compatibility profile objects registered by the WPAR Manager Agent. Relevant tests for a specific WPAR listed in the compatibility policy are retrieved from the CompatibilityPolicy table and compared to failures stored in the CompatibilityFailures table. In this manner, the WPAR manager leverages the compatibility policy defined by the user to filter target system candidates when ranking the compatible target system candidates for a mobility operation.

Figure 5:
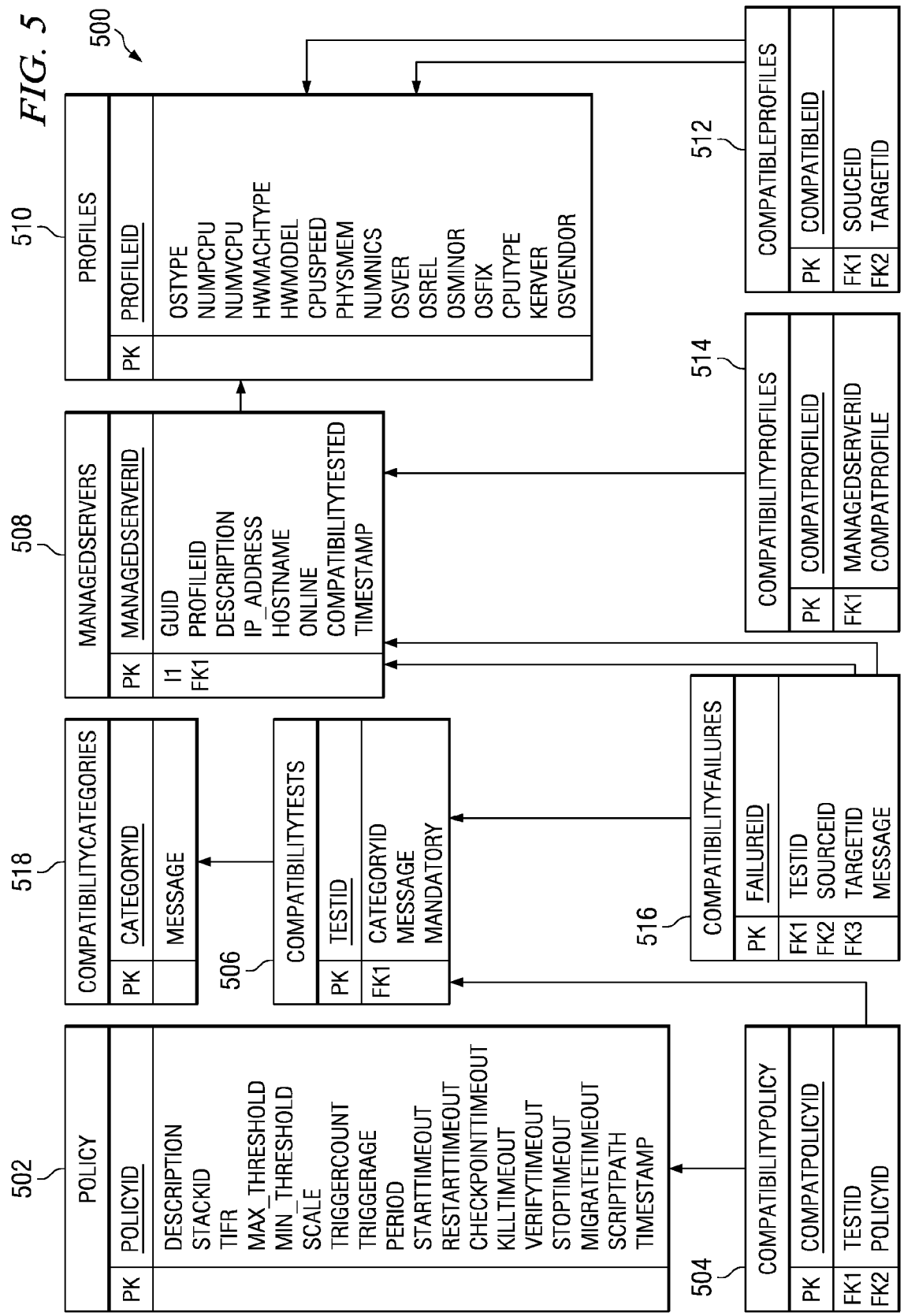
FIG. 5 is a database schema illustrating how the compatibility policy is implemented in a WPAR environment in accordance with the illustrative embodiments.

FIG. 5 is a database schema illustrating how the compatibility policy may be implemented in accordance with the illustrative embodiments. Database schema 500 may be implemented in a data processing system such as system 300 in FIG. 3. In this illustrative example, database schema 500 inner joins Policy table 502, CompatibilityPolicy table 504, CompatibilityTests table 506, ManagedServers table 508, Profiles table 510, CompatibleProfiles table 512, CompatibilityProfiles table 514, and CompatibilityFailures table 516 to allow a WPAR manager to generate a list of target systems which meet the compatibility criteria of a given policy for a given WPAR instance. This list of target systems is dynamic and may change based on which managed server the WPAR instance is initially deployed. Leveraging this database schema 500 design, the WPAR manager is able to determine which target systems should be ranked when determining compatible targets for a mobility operation.

Database schema 500 includes several tables which describe various policies and the compatibility testing available for implementation in the system. For instance, Policy table 502 describes the high level parameters of a mobility policy for a particular WPAR instance. The user may define a compatibility policy by entering parameter values into Policy table 502. These parameters define how the particular performance state of a WPAR instance is ranked and rated by the user. The WPAR instance is associated to a particular policy in Policy table 502 by assigning the POLICYID of a specific row in Policy table 502 to the particular WPAR instance.

CompatibilityPolicy table 504 specifies the actual compatibility tests to be performed by a particular compatibility policy in Policy table 502. Thus, a compatibility policy for a WPAR instance may be defined as N number of tests which the user enters into CompatibilityPolicy table 504. Any WPAR instance that is associated with this particular compatibility policy will require having these compatibility policy tests executed to determine the list of compatible servers for the WPAR instance. CompatibilityPolicy table 504 is related to Policy table 502 via the foreign key reference on the POLICYID field in CompatibilityPolicy table 504.

CompatibilityTests table 506 comprises a list of all available compatibility tests which are in the compatibility jar, which is provided as part of the base operating system installation. These available compatibility tests are defined by the compatibility profile object which is retrieved from the managed server in the Register Server phase in FIG. 3. Compatibility tests may be associated to a collection of WPAR instances through entries in CompatibilityPolicy table 504 which reference CompatibilityTests table 506 through a foreign key relationship on the common TESTID field. Entries in CompatibilityTests table 506 may be either mandatory compatibility tests or optional compatibility tests, as indicated by the MANDATORY flag in the table.

CompatibilityCategories table 518 is a descriptive table which provides information about a compatibility test in CompatibilityTests table 506. For example, an entry in CompatibilityCategories table 518 may specify that a compatibility test is a network test, mandatory test, etc. Entries in CompatibilityCategories table 518 may be used for user reporting and readability.

Database schema 500 also comprises several generic tables which describe the managed servers in the system, the various hardware profiles associated with the managed servers, and which profiles are compatible with each other based on the mandatory compatibility criteria. For example, ManagedServers table 508 defines the unique criteria associated with each server under management, such as the server's IP address, host name, etc.

Profiles table 510 comprises the various hardware profiles associated with each of the managed servers defined in ManagedServers table 508, and may contain common criteria which are shared among any number of the managed servers.

CompatibleProfiles table 512 describes which hardware profiles in Profiles table 510 are compatible with each other. CompatibleProfiles table 512 is populated with the SOURCEID and the TARGETID of compatible systems from the results of the mandatory compatibility tests which are performed in the Execute Tests 412 phase of the compatibility testing process in FIG. 4. Since CompatibleProfiles table 512 comprises a list of compatible systems based on the mandatory tests, the WPAR manager may filter the list of available systems by the information in the CompatibleProfiles table 512 based on where the WPAR instance is currently running (i.e., the WPAR's current profile), regardless of the tests that are specified in the CompatibilityPolicy table 504. Thus, by using the information stored in CompatibleProfiles table 512 which lists compatible systems based on results of mandatory compatibility tests, the WPAR manager does not have to execute the mandatory tests specified in the CompatibilityPolicy table 504 for the mobility operation.

Server profiles may be "one way" or "bi-directionally" compatible based on the results of the relevant mandatory compatibility tests. One way compatible profiles will generate a single entry in CompatibleProfiles table 512, with the SOURCEID and TARGETID fields indicating the direction of compatibility. Bi-directionally compatible profiles generate two entries in CompatibleProfiles table 512, with the values found in SOURCEID and TARGETID fields reversed which indicates that mobility may be possible in either direction between servers with the given PROFILEIDs.

CompatibilityProfiles table 514 comprises the profiles of the managed servers which are determined to be compatible to WPAR instances defined by the particular policy in Policy table 502. CompatibilityProfiles table 514 is joined to ManagedServers table 508 via the foreign key reference on the MANAGEDSERVERID field in CompatibilityProfiles table 514. CompatibilityProfiles table 514 is populated with the properties of all of the tests that are relevant for each managed server during Execute Tests phase 412 of the compatibility testing process in FIG. 4. As previously mentioned, when a managed server is registered in the system, the managed server obtains all of the properties of all of the tests that are relevant for itself, and then provides this information to the management server in the form of a compatibility profile object. Since each managed server provides its profile information to the management server upon registration, the WPAR manager on the management server may execute compatibility operations without having to communicate with each individual managed server, since the management server has a complete managed server profile inventory stored in the management database. This feature is particularly advantageous if the system comprises a large array of servers, because otherwise the WPAR manager would have to determine the compatibility state of each individual managed server at runtime (which may take hours) prior to being able to perform the mobility operation. Thus, part of Get Profile phase 408 in FIG. 4 is for a managed server to collect the information from itself and then file this profile up with the management server in Register Server phase 410. Consequently, when the compatibility tests are executed in Execute Tests phase 412 and Find Target phase 414 in FIG. 4, no communications outside of the management server (WPAR manager) are required. CompatibilityProfiles table 514 is related to ManagedServers table 508 via the foreign key reference on the MANAGEDSERVERID field in ManagedServers table 508.

CompatibilityFailures table 516 contains a list of all tests which failed between any of the compatibility profile objects. CompatibilityFailures table 516 allows the WPAR manager to report compatibility failures back to the user. If the compatibility profile objects of managed servers are determined to be incompatible based on execution of a mandatory or optional compatibility test in CompatibilityTest table 506, the WPAR manager creates an entry in CompatibleProfiles table 512 for each incompatible mandatory or optional test that the WPAR manager finds between the compatibility profile object and any other compatibility profile object the management server has registered during the comparison. Thus, after the mandatory tests are executed to generate a list of compatible target systems for the WPAR instance, the WPAR manager may determine if there are optional tests that should be executed according to the compatibility policy, and the list of target systems is filtered based on the results of the optional tests. After these additional tests are executed, CompatiblityFailures table 516 is checked by the WPAR manager to filter any target system out of the list which failed any of the tests.

Figure 6:
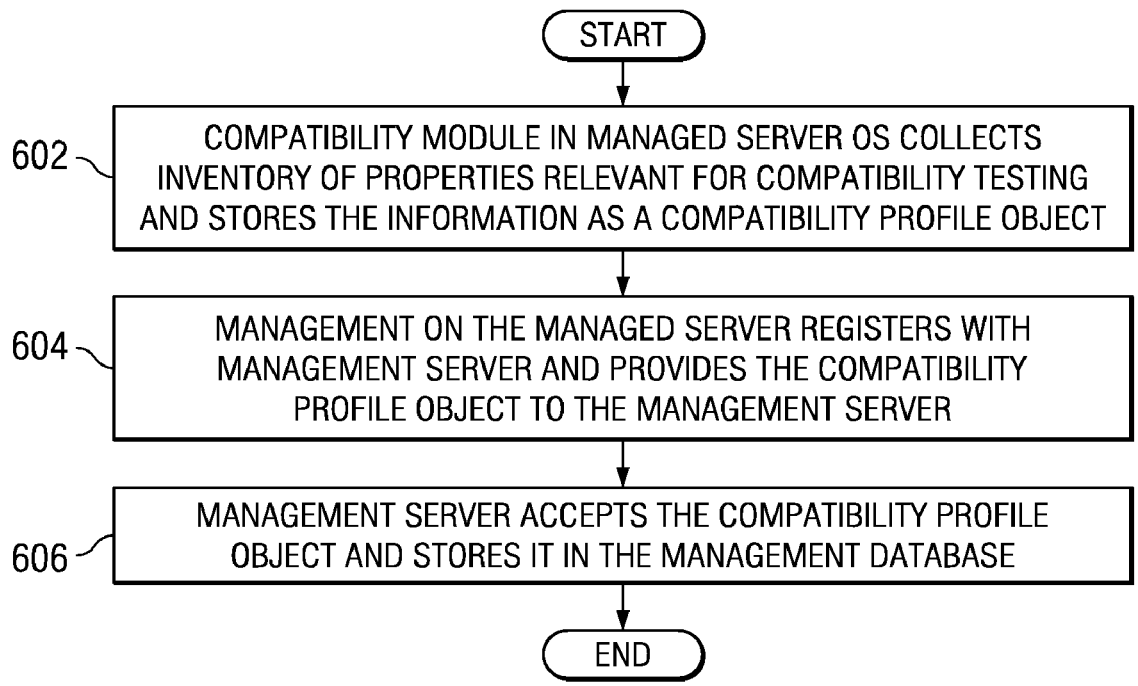
FIG. 6 is a flowchart of a process for obtaining compatibility properties related to mobility of virtual servers in accordance with the illustrative embodiments.

FIG. 6 is a flowchart of a process for obtaining compatibility properties related to mobility of virtual servers in accordance with the illustrative embodiments. The process described in FIG. 6 may be implemented in a data processing system, such as system 300 in FIG. 3. The process begins with a compatibility module provided in the operating system of a managed server collecting a detailed inventory of various properties which are relevant for compatibility testing and storing the collected information as a compatibility profile object (step 602). Properties are relevant for compatibility if the list of properties has been determined to be interesting for the WPAR Manager to analyze and for the user to have available for association with a compatibility policy. This list is hard coded into the compatibility module distributed with the operating system. When a management agent on the managed server registers with the management server, the management agent provides the compatibility profile object generated by the compatibility module to the management server (step 604). The management server accepts the compatibility profile object and stores the compatibility profile object in a profiles table in the management database (step 606).

Figure 7:
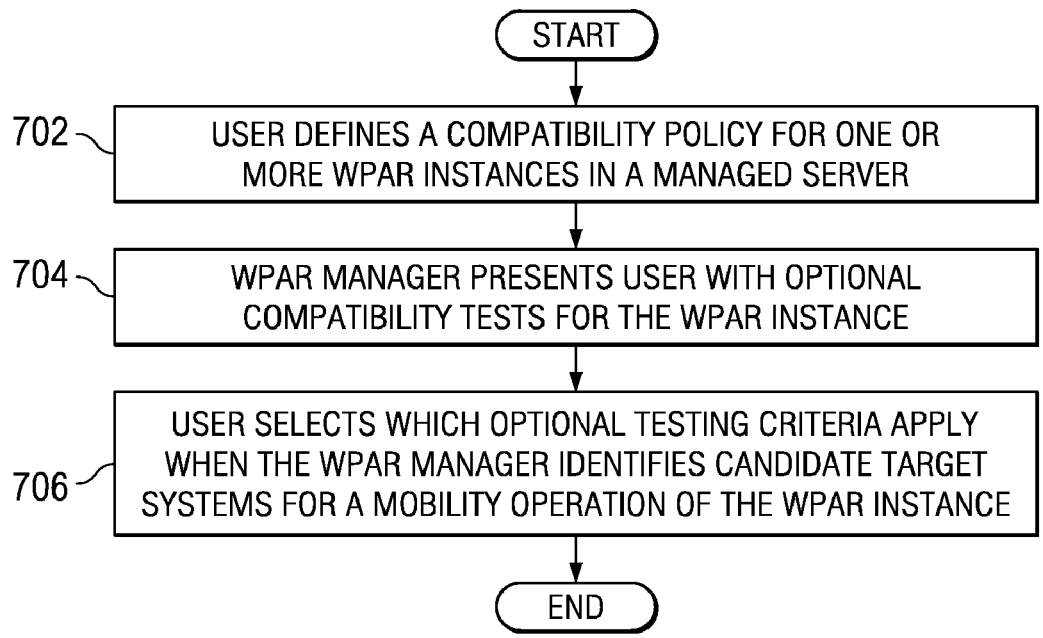
FIG. 7 is a flowchart of a process for defining a compatibility policy for a specific set of WPAR instances in accordance with the illustrative embodiments.

FIG. 7 is a flowchart of a process for defining a compatibility policy for a specific set of WPAR instances in accordance with the illustrative embodiments. The process described in FIG. 7 may be implemented in a WPAR manager, such as WPAR manager 306 in FIG. 3. The process begins with a user defining a compatibility policy for one or more WPAR instances in a managed server in a Policy table (step 702). To define the policy for a WPAR instance, the user may use the information in the compatibility profile object representing the hardware and software properties of the managed server on which the WPAR instance is running. Once the policy is created, the user is presented with optional compatibility tests for the WPAR instance in a CompatibilityTests table which the user may associate with the created policy (step 704). By selecting an optional compatibility test to associate with the policy, the user specifies which optional testing criteria should apply when the WPAR manager identifies candidate target systems for a mobility operation of the WPAR instance (step 706). The WPAR manager may then leverage the compatibility policy created by the user to filter available target systems when ranking targets for a mobility operation.

Figure 8:
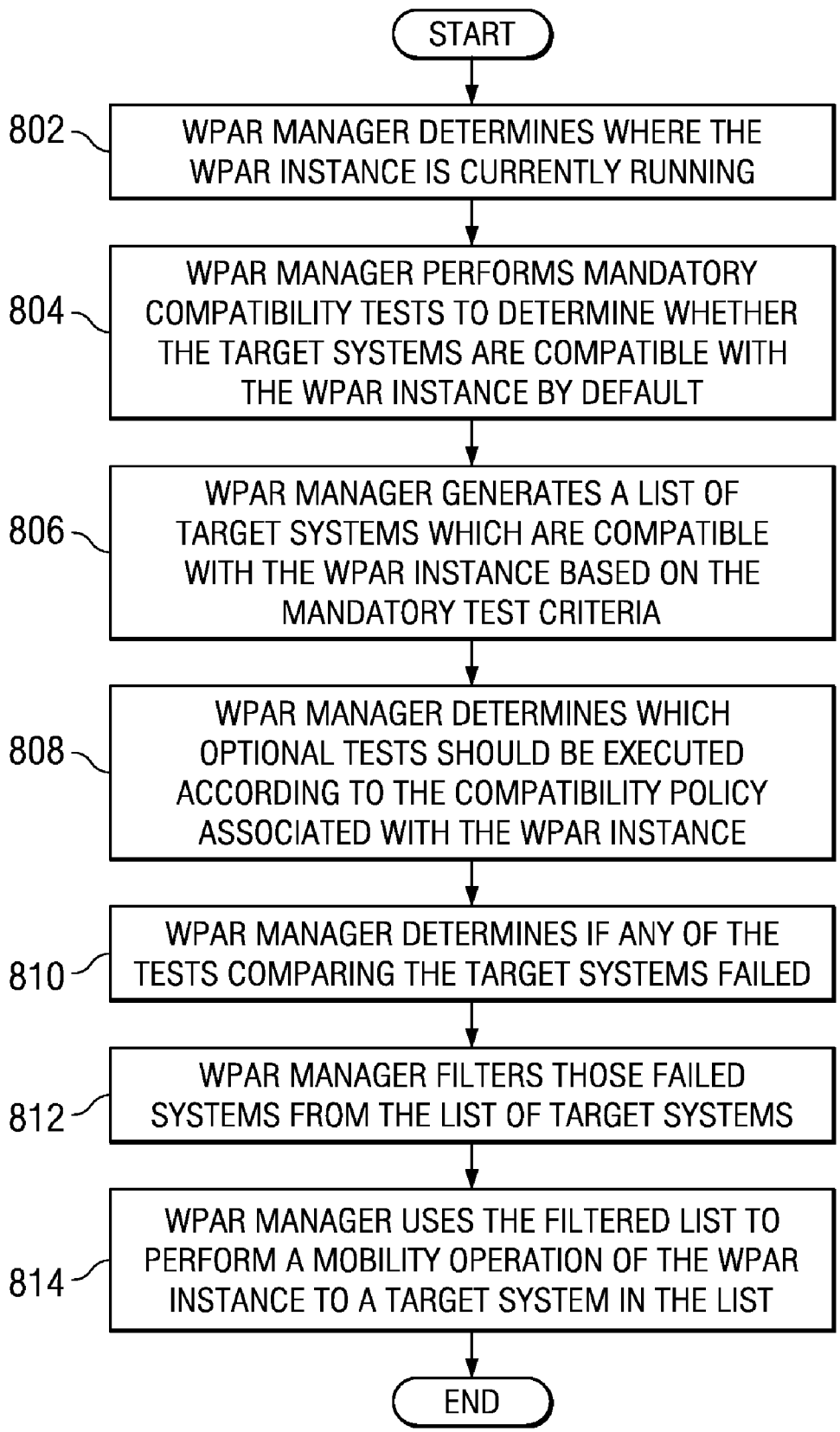
FIG. 8 is a flowchart of a process for determining hardware and software compatibility related to mobility of virtual servers in accordance with the illustrative embodiments.

FIG. 8 is a flowchart of a process for determining hardware and software compatibility related to mobility of virtual servers in accordance with the illustrative embodiments. The process described in FIG. 8 may be implemented in a WPAR manager, such as WPAR manager 306 in FIG. 3. The process begins with the WPAR manager determining where the WPAR instance is currently running (step 802). This information is made available to the WPAR manager when the WPAR is created or deployed for the first time. The WPAR manager tracks the current location of all WPARs and updates this information in its database whenever a WPAR is relocated.

Once the compatibility profile object from the managed server is stored in the management database, the WPAR manager references the compatibility policy created by the user to compare the compatibility profile object from the managed server with all other previously registered compatibility profile objects from other managed servers, and determines which server profiles have passed all mandatory compatibility tests specified in the policy by referencing CompatibleProfiles table 512 in FIG. 5 (step 804). For example, a mandatory test may comprise comparing the processor type or operating system type of the systems. The WPAR manager generates a list of target systems which are compatible with the system containing the WPAR instance based on the server profiles which have passed the mandatory test criteria by executing a SELECT against the CompatibleProfiles table using the source partition's MANAGEDSERVERID as a criteria (step 806).

The WPAR manager may then determine which optional (additional) tests are associated with the WPAR instance and should be executed according to the WPAR instance's compatibility policy by referencing the CompatibilityPolicy table 504 in FIG. 5 (step 808). These optional tests may comprise comparing properties which are specific to that particular WPAR instance. Test failures are identified by referencing the CompatibilityFailures table 516 in FIG. 5 using the TESTID specified in the compatibility policy and the source MANAGEDSERVERID for the system containing the WPAR. This identification allows the WPAR manager to determine if any of the optional tests listed in the compatibility policy for the WPAR have failed (step 810). Any server which has a failure listed for an optional test specified in the compatibility policy for the WPAR is removed from the list of potential target systems (step 812). The resulting filtered list of target systems comprises a list of target systems which are compatible enough to support migration of the process collections within the WPAR instance. This filtered list may be used to perform a mobility operation of the WPAR instance to a target system in the list. The WPAR manager may then select a target system from the list based on the current performance state of the WPAR instance and the various server partitions identified in the list (step 814).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for defining a compatibility policy for a workload partition instance in a managed server, the computer implemented method comprising:

responsive to receiving, from a managed server, an inventory of properties of the managed server which are relevant for compatibility testing, defining mandatory properties and optional properties available for use in a compatibility policy for a workload partition instance running on the managed server;

selecting mandatory compatibility tests based on the mandatory properties in the compatibility policy for the workload partition instance;

selecting optional compatibility tests based on the optional properties in the compatibility policy for the workload partition instance; and associating the selected mandatory compatibility tests and selected optional compatibility tests for the workload partition instance with the compatibility policy, wherein the selected mandatory compatibility tests and selected optional compatibility tests are executed to compare a profile of a potential target system with the workload partition instance and to determine compatibility of the potential target system with the workload partition instance prior to performing a mobility operation of the workload partition instance.

2. The computer implemented method of claim 1, wherein the mandatory compatibility tests include tests comprising common compatibility criteria to be executed for all workload partition instances.

3. The computer implemented method of claim 2, wherein the common compatibility criteria include processor type, revision type, or operating system type of the workload partition instance.

4. The computer implemented method of claim 1, wherein the optional compatibility tests include tests which comprise optional compatibility criteria to be executed for a workload partition instance when specified in the compatibility policy associated with the workload partition instance.

5. The computer implemented method of claim 4, wherein the optional compatibility criteria include memory page size.

6. The computer implemented method of claim 1, wherein the inventory of properties of the managed server are received in a compatibility profile object representing hardware and software properties of the managed server.

7. The computer implemented method of claim 1, wherein the compatibility policy is defined by a user.

8. The computer implemented method of claim 1, wherein the optional compatibility tests are selected by a user.

9. The computer implemented method of claim 1, wherein the defining, selecting, and associating steps are implemented in workload partition manager.

10. The computer implemented method of claim 1, further comprising:
    removing the potential target system from a list of potential target systems in response to determining the potential target system is not compatible with the workload partition instance.

11. A computer program product for defining a compatibility policy for a workload partition instance in a managed server, the computer program product comprising:
    A non-transitory, computer-readable storage medium having computer usable program code tangibly embodied thereon, the computer usable program code comprising:
    computer usable program code for receiving, from a managed server, an inventory of properties of the managed server which are relevant for compatibility testing;
    computer usable program code for, defining mandatory properties and optional properties available for use in a compatibility policy for a workload partition instance running on the managed server;
    computer usable program code for selecting mandatory compatibility tests based on the mandatory properties in the compatibility policy for the workload partition instance;
    computer usable program code for selecting optional compatibility tests based on the optional properties in the compatibility policy for the workload partition instance; and
    computer usable program code for associating the selected mandatory compatibility tests and selected optional compatibility tests for the workload partition instance with the compatibility policy, wherein the selected mandatory compatibility tests and selected optional compatibility tests are executed to compare a profile of a potential target system with the workload partition instance and to determine compatibility of the potential target system with the workload partition instance prior to a performing a mobility operation of the workload partition instance.

12. The computer program product of claim 11, wherein the mandatory compatibility tests include tests comprising common compatibility criteria to be executed for all workload partition instances.

13. The computer program product of claim 12, wherein the common compatibility criteria include processor type, revision type, or operating system type of the workload partition instance.

14. The computer program product of claim 11, wherein the optional compatibility tests include tests which comprise optional compatibility criteria to be executed for a workload partition instance when specified in the compatibility policy associated with the workload partition instance.

15. The computer program product of claim 14, wherein the optional compatibility criteria include memory page size.

16. The computer program product of claim 11, wherein the inventory of properties of the managed server are received in a compatibility profile object representing hardware and software properties of the managed server.

17. The computer program product of claim 11, wherein the compatibility policy is defined by a user.

18. The computer program product of claim 11, wherein the optional compatibility tests are selected by a user.

19. The computer program product of claim 11, further comprising:
    computer usable program code for removing the potential target system from a list of potential target systems in response to determining the potential target system is not compatible with the workload partition instance.

20. A data processing system for defining a compatibility policy for a workload partition instance in a managed server, the data processing system comprising:
    a bus;
    a storage device connected to the bus, wherein the storage device contains computer usable code;
    at least one managed device connected to the bus;
    a communications unit connected to the bus; and
    a processor unit connected to the bus, wherein the processor unit executes the computer usable code to define mandatory properties and optional properties available for use in a compatibility policy for a workload partition instance running on the managed server; select mandatory compatibility tests based on the mandatory properties in the compatibility policy for the workload partition instance; select optional compatibility tests based on the optional properties in the compatibility policy for the workload partition instance; and associate the selected mandatory compatibility tests and selected optional compatibility tests for the workload partition instance with the compatibility policy, wherein the selected mandatory compatibility tests and selected optional compatibility tests are executed to compare a profile of a potential target system with the workload partition instance and to determine compatibility of the potential target system with the workload partition instance prior to a performing a mobility operation of the workload partition instance.

* * * * *

UNITED STATES PATENT AND TRADEMARK OFFICE
CERTIFICATE OF CORRECTION

PATENT NO. : 7,792,941 B2  
APPLICATION NO. : 11/689034  
DATED : September 7, 2010  
INVENTOR(S) : Fried et al.

It is certified that error appears in the above-identified patent and that said Letters Patent is hereby corrected as shown below:

Title Page:  
Item [75], line 4, replace "Jorge D. Rodriquez" with -- Jorge D. Rodriguez --

Signed and Sealed this  
Twenty-first Day of May, 2013

Teresa Stanek Rea  
*Acting Director of the United States Patent and Trademark Office*